(12) United States Patent
Devault et al.

(10) Patent No.: US 12,139,269 B2
(45) Date of Patent: Nov. 12, 2024

(54) CAPTURE OF HYDROGEN BOILOFF

(71) Applicant: ZeroAvia, Inc., Hollister, CA (US)

(72) Inventors: Gabriel Devault, Watsonville, CA (US); Bob Lee Mackey, San Jose, CA (US)

(73) Assignee: ZeroAvia, Inc., Hollister, CA (US)

( * ) Notice: Subject to any disclaimer, the term of this patent is extended or adjusted under 35 U.S.C. 154(b) by 204 days.

(21) Appl. No.: 17/870,717

(22) Filed: Jul. 21, 2022

(65) Prior Publication Data

US 2023/0123465 A1    Apr. 20, 2023

Related U.S. Application Data

(63) Continuation-in-part of application No. 17/804,299, filed on May 26, 2022, now Pat. No. 12,030,611.

(Continued)

(51) Int. Cl.
*B64D 37/04* (2006.01)
*B60L 58/30* (2019.01)
(Continued)

(52) U.S. Cl.
CPC .............. *B64D 37/04* (2013.01); *B60L 58/30* (2019.02); *B64B 1/24* (2013.01); *B64B 1/62* (2013.01); *B64D 41/00* (2013.01); *H01M 8/04089* (2013.01); *H01M 8/04208* (2013.01); *B64D 2041/005* (2013.01); *H01M 2250/20* (2013.01)

(58) Field of Classification Search
CPC .. B64D 37/04; B64D 41/00; B64D 2041/005; B64B 1/24; B64B 1/62; B60L 58/30; H01M 8/04089; H01M 8/04208; H01M 2250/20
See application file for complete search history.

(56) References Cited

U.S. PATENT DOCUMENTS 6,896,222 B2    5/2005   Dossas et al.
8,342,442 B1 *  1/2013   Dancila ................... B64B 1/30
                                                    244/128

(Continued)

FOREIGN PATENT DOCUMENTS

GB         2569002 A     6/2019
WO      2023064944 A1    4/2023

OTHER PUBLICATIONS

ISA/EP, International Search Report and Written Opinion for International Application No. PCT/US2022/078176, 18 pages, Jan. 20, 2023.

(Continued)

*Primary Examiner* — Tye William Abell
(74) *Attorney, Agent, or Firm* — Osha Bergman Watanabe & Burton LLP

(57) ABSTRACT

A hydrogen boiloff capture system. The hydrogen boiloff capture system having a cryogenic tank for storing liquid hydrogen. The hydrogen boiloff capture system also includes an intermediate tank fluidically coupled with the cryogenic tank. The intermediate tank is configured to receive hydrogen gas boiloff from the cryogenic tank. The intermediate tank is further configured to provide the hydrogen gas boiloff to a lighter-than-air craft to regulate buoyancy of the lighter-than-air craft. The intermediate tank is also configured to provide the hydrogen gas boiloff to a hydrogen fuel cell coupled to the lighter-than-air craft.

6 Claims, 13 Drawing Sheets

Related U.S. Application Data

(60) Provisional application No. 63/262,495, filed on Oct. 14, 2021.

(51) Int. Cl.
  *B64B 1/24* (2006.01)
  *B64B 1/62* (2006.01)
  *B64D 41/00* (2006.01)
  *H01M 8/04082* (2016.01)
  *H01M 8/04089* (2016.01)

(56) References Cited

U.S. PATENT DOCUMENTS

| | | |
|---|---|---|
| 2003/0207164 A1 | 11/2003 | McElroy et al. |
| 2003/0230671 A1 | 12/2003 | Dunn |
| 2003/0234320 A1 | 12/2003 | Colting |
| 2004/0155149 A1 | 8/2004 | Dossas et al. |
| 2005/0224638 A1 | 10/2005 | Goodey |
| 2007/0069077 A1 | 3/2007 | Colting |
| 2009/0145999 A1* | 6/2009 | Porter ............... B64B 1/58 244/31 |
| 2009/0206194 A1 | 8/2009 | Sinsabaugh |
| 2009/0294576 A1* | 12/2009 | LaForge ............. H01Q 1/248 244/30 |
| 2012/0156059 A1* | 6/2012 | Watts ............... B64D 37/30 417/208 |
| 2018/0319477 A1 | 11/2018 | Yakub |
| 2020/0398992 A1 | 12/2020 | Morrison |
| 2023/0117737 A1 | 4/2023 | Miftakhov et al. |

OTHER PUBLICATIONS

ISA/EP, International Search Report and Written Opinion for International Application No. PCT/US2023/070462, 16 pages, Sep. 27, 2023.

International Preliminary Report On Patentability issued in International Application No. PCT/US2022/078176 dated Apr. 16, 2024 (13 pages).

* cited by examiner

CAPTURE OF HYDROGEN BOILOFF

CROSS-REFERENCE TO RELATED APPLICATIONS

This application is claims priority to and is a continuation-in-part of U.S. patent application Ser. No. 17/804,299 filed on May 26, 2022, entitled "LIGHTER-THAN-AIR CRAFT WITH HYDROGEN PROPULSION" by Miftakhov et al, assigned to the assignee of the present application, the disclosure of which is herein incorporated by reference in its entirety.

The application Ser. No. 17/804,299 claims priority to and the benefit of U.S. Provisional Patent Application No. 63/262,495, filed on Oct. 14, 2021, entitled "LIGHTER-THAN-AIR CRAFT WITH HYDROGEN PROPULSION" by Miftakhov et al., and assigned to the assignee of the present application, the disclosure of which is hereby incorporated herein by reference in its entirety.

This application also claims priority to and the benefit of U.S. Provisional Patent Application No. 63/262,495, filed on Oct. 14, 2021, entitled "LIGHTER-THAN-AIR CRAFT WITH HYDROGEN PROPULSION" by Miftakhov et al., and assigned to the assignee of the present application, the disclosure of which is hereby incorporated herein by reference in its entirety.

FIELD OF THE INVENTION

The present invention pertains to lighter-than-air (LTA) craft, lifting gases for LTA craft and the capture of hydrogen boiloff.

BACKGROUND

The term "LTA craft" refers to several types of aircraft which, at least partially, utilize a lighter-than-air gas to produce lift. LTA craft include, but are not limited to, steerable LTA craft, dirigibles, blimps, rigid airships, semi-rigid airships, Zeppelins, hybrid airships, and the like. Steerable LTA craft and dirigibles generally refer to any LTA craft which is powered and steerable. Blimps are LTA craft having an outer envelope whose shape or physical configuration is maintained by the internal pressure of the lifting gas confined within the envelope. Unlike blimps, semi-rigid and rigid LTA craft have a framework which at least partially defines the shape or configuration of the envelope of the LTA craft. Zeppelins refer to a particular type of rigid LTA craft produced by the Luftschiffbau Zeppelin company of Germany. Hybrid LTA craft produce lift using a combination of lighter-than-air gas and an aerodynamic feature such as, for example, a wing or a rotor.

LTA craft have significant utility as lifting vehicles, passenger transports, research tools, and numerous other applications. LTA craft have, in the past, been considered such an essential mode of air travel that the spire of the Empire State building was originally built and intended for use as a mast to moor LTA craft. Several infamous incidents with LTA craft, which utilized highly flammable lifting gases, found LTA craft losing favor among the general population as passenger transport vehicles. Despite such incidents, LTA craft remain an important and valuable tool in the field of modern aeronautics.

In various applications, liquid hydrogen is cryogenically stored. Sustained cryogenic storage of liquid hydrogen typically requires the use of durable storage tanks under very high pressures (5000-10,000 psi storage tank pressure), and/or insulation of the durable storage tank, and/or some form of active cooling. Such mechanisms for sustained cryogenic storage have an intrinsic weight penalty associated therewith. Specifically, durable storage tanks are heavy, and the insulation often used in conjunction with the durable storage tanks further compounds the weight penalty associated with cryogenic storage of liquid hydrogen. Additionally, any active cooling system will inherently increase the weight penalty corresponding to the use of conventional mechanisms for sustained cryogenic storage of liquid hydrogen. As a result of the weight penalty, conventional cryogenic storage mechanisms for liquid hydrogen are not well suited for use in LTA craft and other aircraft where increases in weight are highly undesirable.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of the Drawings should be understood as not being drawn to scale. Herein, like items are labeled with like item numbers.

FIG. 12 is a schematic diagram of a lighter-than-air (LTA) craft having a cryogenic tank, an intermediate tank, a hydrogen fuel cell and a propulsion system coupled thereto, in accordance with embodiments of the present invention.

DESCRIPTION OF EMBODIMENTS

Figure 1:
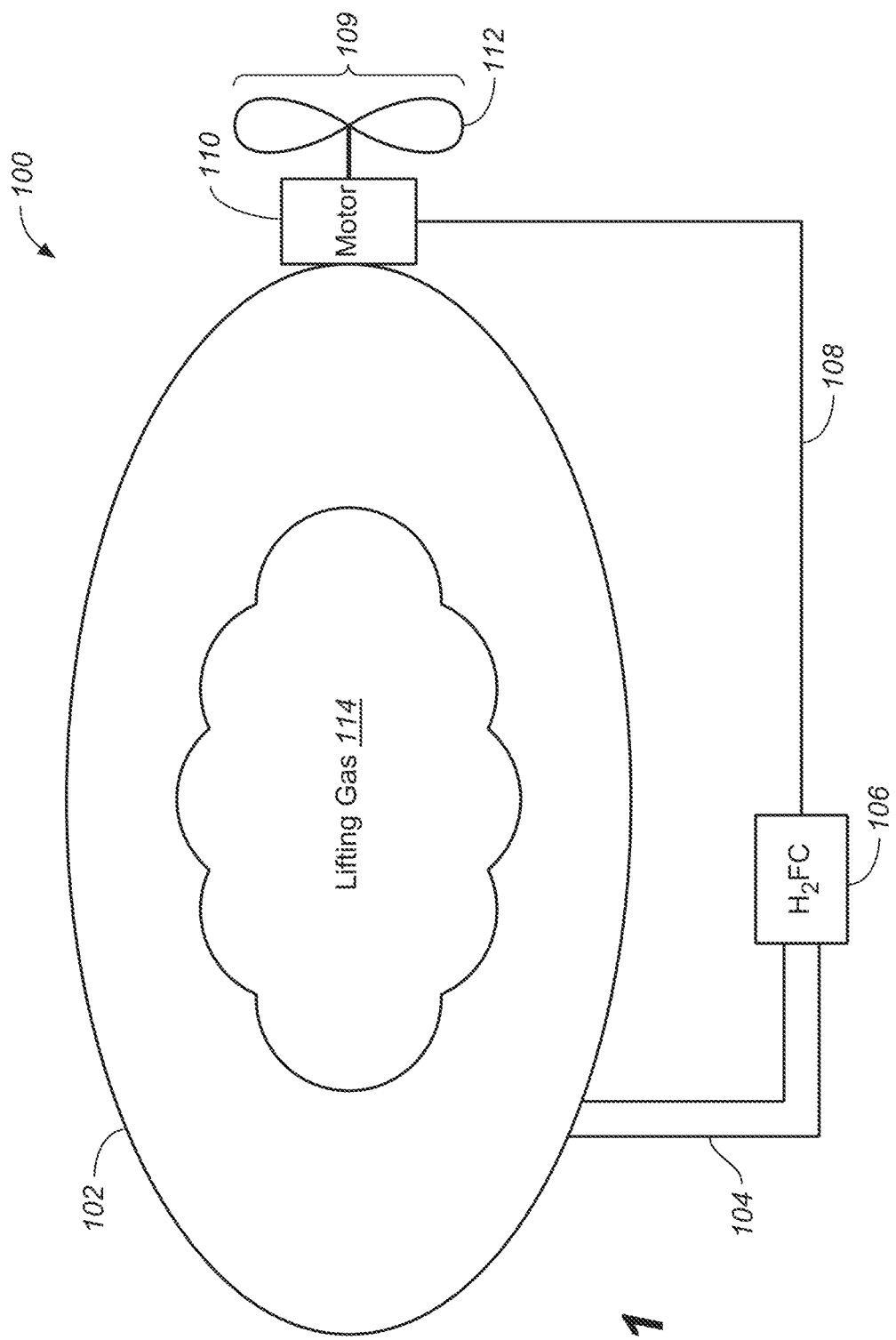
FIG. 1 is a schematic diagram of a lighter-than-air (LTA) craft having a hydrogen fuel cell and a propulsion system coupled thereto, in accordance with embodiments of the present invention.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope of the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail so as not to unnecessarily obscure aspects of the described embodiments.

Reference throughout this specification to "one embodiment," "certain embodiments," "an embodiment," "various embodiments," "some embodiments," or similar term(s) means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Although one or more embodiments of the present invention have been described in some detail for clarity of understanding, it will be apparent that certain changes and modifications may be made within the scope of the various embodiments. Accordingly, the described embodiments are to be considered as illustrative and not restrictive, and the scope of the various embodiments is not to be limited to details given herein, but may be modified. In the various embodiments, elements and/or any described steps do not imply any particular order of operation, unless explicitly stated therein.

As an overview, LTA craft have, in the past, utilized various flammable lifting gases for buoyancy. Due to the inherent risks associated with the use of flammable lifting gases, many flammable lifting gases are now considered far too dangerous for use in LTA craft. Hydrogen, for example, has long been deemed unsuitable for use as a lifting gas in LTA craft. As an example, hydrogen has been completely abandoned for use as a lifting gas in passenger LTA craft since the late 1930s. As will be described in detail below, embodiments of the present invention provide a novel lifting gas which includes components currently dismissed as too dangerous for use in LTA craft. Additionally, below described embodiments of the present invention will uniquely and advantageously utilize the currently dismissed lifting gas component as a power source for the LTA craft.

With reference now to FIG. 1, a schematic diagram of an LTA craft 100 in accordance with an embodiment of the present invention is shown. LTA craft 100 of the present embodiment includes an envelope 102 which surrounds and confines a lifting gas 114. Although graphically depicted as 114, it will be understood that in some embodiments of the present invention, lifting gas 114 will occupy the entirety of the available volume enclosed within envelope 102. Additionally, lifting gas 114 will be described in detail below. LTA craft 100 further comprises a supply line 104 which fluidically couples lifting gas 114 disposed within envelope 102 with a hydrogen fuel cell 106. Referring still to LTA craft 100, an electrical supply line 108 is shown electrically coupling hydrogen fuel cell 106 with a propulsion system 109 comprised of motor 110 and propeller 112. Although propulsion system 109 of LTA craft 100 is comprised of motor 110 and propeller 112, embodiments of the present invention are well suited to use with a predominantly-electric propulsion system comprised of components other than motor 110 and propeller 112. A propulsion system may be understood to comprise a means of providing thrust in any direction.

With reference still to FIG. 1, it should be noted that, for purposes of brevity and clarity, LTA craft 100 of the present embodiment may include various other components not depicted in FIG. 1 or described in the present specification. Such components can include, but are not limited to, a cockpit, passenger seating, hoisting mechanisms, mooring devices, and the like. Furthermore, it should be noted that the various embodiments described herein are well suited to use with numerous types of LTA craft including, but not limited to, steerable LTA craft, dirigibles, blimps, rigid airships, semi-rigid airships, Zeppelins, hybrid airships, and the like.

Referring now to lifting gas 114 of FIG. 1, in one embodiment of the present invention, lifting gas 114 is comprised of helium and hydrogen gas. As stated previously, hydrogen has long been deemed unsuitable for use as a lifting gas in LTA craft due to the flammability of hydrogen. In the present embodiment, lifting gas 114 is comprised of a mixture wherein the percent by volume of hydrogen does not exceed approximately 4 percent. As hydrogen has a lower explosive limit (LEL) of approximately 4 percent by volume in air, embodiments of the present invention advantageously provide a hydrogen-containing lifting gas which does not suffer from the flammability concerns previously associated with conventional hydrogen lifting gases. In another embodiment, lifting gas 114 is comprised of a mixture wherein the percent by volume of hydrogen does not exceed a percentage such that when lifting gas 114 escapes to an environment where sufficient oxygen for combustion is present and mixes to form a local mixture, the percent by volume of hydrogen in the local mixture does not exceed the LEL at any point. As a result, lifting gas 114 of the present embodiment is nonflammable during operating conditions for LTA craft 100. For purposes of the present Application, the phrase "operating conditions for LTA craft" refers to fueling, pre-flight activities, take-off, flight, in-flight operations of all types, mooring, landing, unloading, disembarking, storing of the LTA craft, and any other activities associated with an LTA craft of any type.

Referring still to lifting gas 114 of FIG. 1, in one embodiment of the present invention, lifting gas 114 is a mixture of helium and hydrogen wherein helium comprises approximately 96 percent by volume of the mixture and hydrogen comprises approximately 4 percent by volume of the mixture. Using, as an example, an LTA craft having 360,000 cubic feet of lifting gas capacity, lifting gas 114 of the present embodiment would be comprised of approximately 14,400 cubic feet of hydrogen and approximately 345,600 cubic feet of helium.

Helium has a gross lifting force of approximately 60 pounds per 1,000 cubic feet at standard temperature and pressure of 32 degrees Fahrenheit and 1 atmosphere. Hydrogen has a gross lifting force of approximately 68 pounds per 1,000 cubic feet at standard temperature and pressure. As a result, in the aforementioned LTA craft having a lifting gas capacity of 360,000 cubic feet, a conventional helium lifting gas would produce 21,600 pounds of gross lifting force. In an embodiment of the present invention in which lifting gas 114 comprises approximately 96 percent by volume of helium and approximately 4 percent by volume of hydrogen, the same LTA craft with the same lifting gas capacity of 360,000 cubic feet produces just over 21,715 pounds of gross lifting force. Thus, in the example provided, lifting gas 114 of the present embodiment provides over 115 pounds of additional gross lifting force. Further, lifting gas 114 of the present embodiment achieves the aforementioned increased lifting force while maintaining the nonflammable safety characteristics of less effective conventional lifting gases.

Additionally, lifting gas 114 of FIG. 1 has other significant advantages over conventional lifting gases. As one example of such advantages, lifting gas 114 of the present embodiment weighs less than conventional helium lifting gases. At standard temperature and pressure, helium has a weight of approximately 11 pounds per 1000 cubic feet. Hydrogen has a weight of approximately 5 pounds per 1000 cubic feet at standard temperature and pressure. Hence, using the same example of an LTA craft having a lifting gas capacity of 360,000 cubic feet, a conventional helium lifting gas would weigh approximately 3,960 pounds. Lifting gas 114 of the present embodiment weighs approximately 3,873 pounds. Hence, lifting gas 114 of the present embodiment beneficially weighs approximately 87 pounds less than the conventional helium lifting gas. Moreover, taking the increased gross lifting force, approximately 115 pounds, in combination with the decreased lifting gas weight, approximately 87 pounds, lifting gas 114 of the present embodiment provides an overall increased lifting capacity of more than 200 lbs. Again, lifting gas 114 of the present embodiment provides such improved lifting performance while maintaining the nonflammable safety characteristics of less effective conventional lifting gases.

As yet another example of the advantages of lifting gas 114 of the present embodiment, lifting gas 114 is less expensive than conventional helium lifting gases, and does not share their scarcity/non-renewability concerns. At present, helium costs approximately $120 per 1000 cubic feet. Furthermore, the cost of helium has risen sharply over recent years and continues to rise. In fact, since approximately 2010, the cost of helium has increased 10-30 percent each year. Hydrogen costs approximately $4.25 per 1000 cubic feet. Returning to the above example, for 360,000 cubic feet, lifting gas 114 of the present embodiment is approximately $1666 less expensive than a conventional helium lifting gas.

With reference again to FIG. 1, a further significant advantage of lifting gas 114 is illustrated. As stated above, in embodiments of the present invention, LTA craft 100 comprises supply line 104 which fluidically couples hydrogen fuel cell 106 and lifting gas 114. As a result, in embodiments of the present invention, not only does lifting gas 114 provide buoyancy for LTA craft 100, lifting gas 114 also provides a suitable hydrogen source for hydrogen fuel cell 106. As described above, in an LTA craft having 360,000 cubic feet of lifting gas capacity, lifting gas 114 of the present embodiment (i.e., approximately 4 percent hydrogen by volume and approximately 96 percent helium by volume) is comprised of 14,400 cubic feet of hydrogen and 345,600 cubic feet of helium. Hence, lifting gas 114 of the present embodiments provides a significant supply of hydrogen for hydrogen fuel cell 106. A related significant advantage is avoiding the need for a fuel tank to hold compressed or liquid hydrogen as a fuel supply for a fuel cell. Hydrogen tanks are generally assumed to be necessary for fuel cell-powered craft even though they raise cost and reduce performance through their significant added weight.

Referring still to FIG. 1, it should be noted that hydrogen fuel cell 106 is comprised of any type of hydrogen fuel cell which utilizes hydrogen and oxygen (the oxygen obtained, for example, from the surrounding air) to generate electricity. It should further be noted, as will be discussed in detail below, that a hydrogen fuel cell, such as hydrogen fuel cell 106, typically also produces heat and water during the exothermic process of generating electricity. As stated above, in the example of an LTA craft having 360,000 cubic feet of lifting gas capacity, lifting gas 114 of the present embodiment is comprised of 14,400 cubic feet of hydrogen. In a hydrogen fuel cell such as, for example, a Polymer Electrolyte Membrane (PEM) hydrogen fuel cell, approximately 30 cubic feet of hydrogen is used per kilowatt hour generated by the hydrogen fuel cell. As lifting gas 114 of the present example includes 14,400 cubic feet of hydrogen, lifting gas 114 enables the generation of up to 480 kilowatt hours of energy by hydrogen fuel cell 106.

Referring still to LTA craft 100 of FIG. 1, in embodiments of the present invention electrical supply line 108 electrically couples hydrogen fuel cell 106 with propulsion system 109. As stated above, although propulsion system 109 of LTA craft 100 is comprised of motor 110 and propeller 112, embodiments of the present invention are well suited to use with a propulsion system comprised of components other than motor 110 and propeller 112, for example many variants of electric propulsion including one or more of a ducted fan, ion drive, directed thrust, tilted lift system, and propeller. In various embodiments of the present invention, propulsion system 109 will further comprise a battery or other electricity storage device, not shown, for storing electricity generated by hydrogen fuel cell 106. Hence, in some embodiments of the present invention, electricity generated by hydrogen fuel cell 106 is provided to propulsion system 109 using electrical supply line 108, and the generated electricity is used to directly power, for example, motor 110 to drive propeller 112. In other embodiments, electricity generated by hydrogen fuel cell 106 and/or stored in an electricity storage device is provided to electrical components of LTA craft including, for example, air conditioning, avionics, control systems, and lighting.

Referring again to FIG. 1, in various other embodiments of the present invention, electricity generated by hydrogen fuel cell 106 is provided to propulsion system 109, using electrical supply line 108, and the generated electricity is stored, for example in a battery, for subsequent and/or simultaneous use by propulsion system 109. Such simultaneous use may occur, for example, during periods of greater power demand or need from propulsion system 109. Further, embodiments of the present invention are well suited to use with various combinations of direct/immediate use of electricity generated by hydrogen fuel cell 106 and storage/deferred use of electricity generated by hydrogen fuel cell 106.

Figure 2:
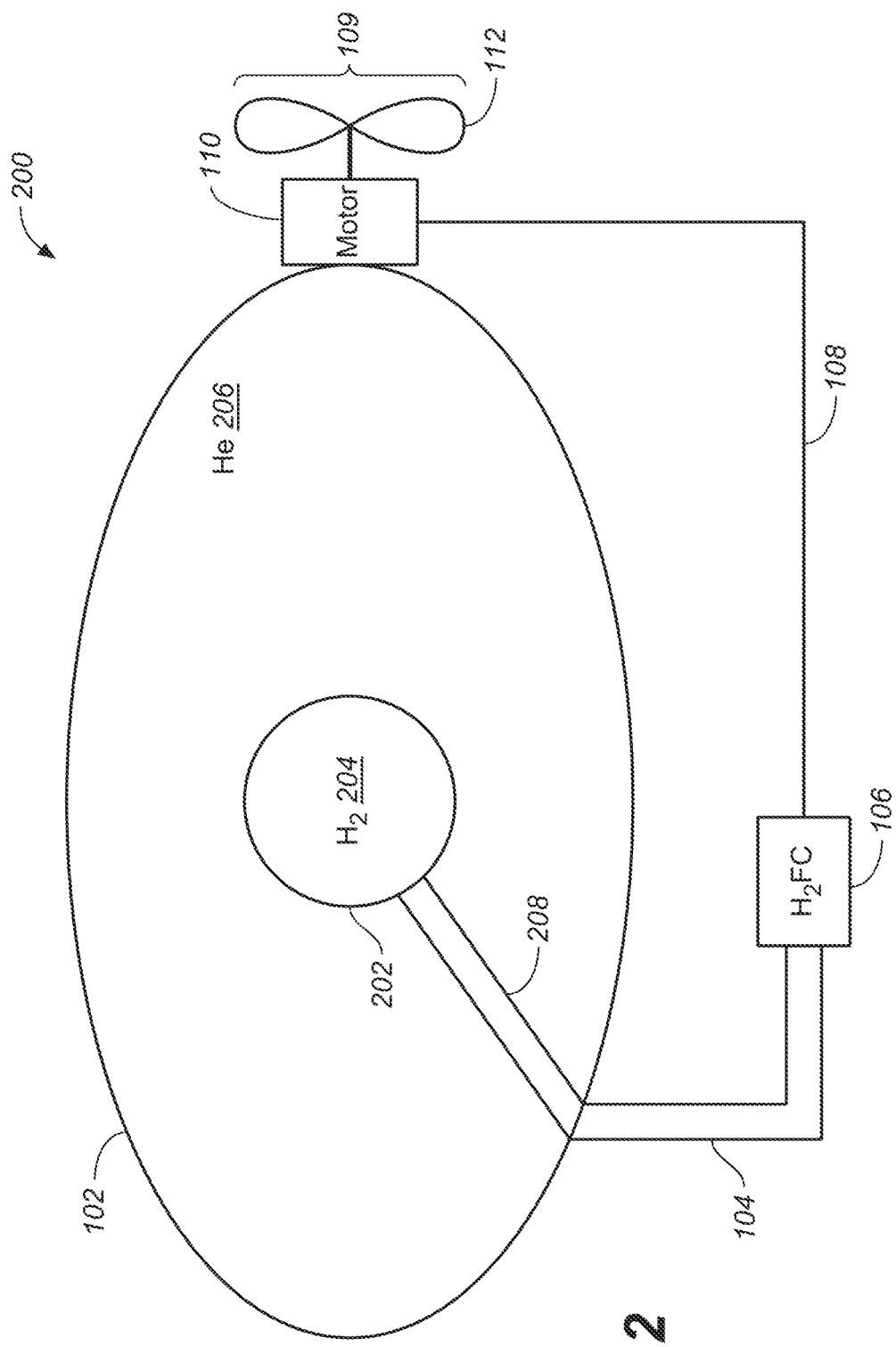
FIG. 2 is a schematic diagram of another embodiment of the present invention in which a lighter-than-air (LTA) craft includes a hydrogen-containing compartment surrounded by a volume of helium, in accordance with embodiments of the present invention.

With reference next to FIG. 2, another embodiment of the present invention is shown in which LTA craft 200 is comprised of envelope 102 and in which the lifting gas is comprised of a compartment 202 disposed within envelope 102. In the present embodiment, compartment 202 contains a volume of hydrogen. In the embodiment of FIG. 2, envelope 102 further contains a volume of helium 206 wherein volume of helium 206 is disposed surrounding compartment 202.

In the embodiment of FIG. 2, the ratio of volume of hydrogen 204 in compartment 202 with respect to the surrounding volume of helium 206 is defined such that if the entirety of the volume of hydrogen 204 and the volume of helium 206 are combined to form a mixture, the mixture is nonflammable during operating conditions for LTA craft 200. That is, in the embodiment of FIG. 2, should even the entirety of the volume of hydrogen 204 in compartment 202 leak into, or otherwise mix with, the surrounding volume of helium 206, the mixture would be comprised of approximately 96 percent by volume of helium and no more than approximately 4 percent by volume of hydrogen. Hence, as with lifting gas 114 of the embodiment of FIG. 1, the embodiment of FIG. 2 ensures that, even under the scenario wherein all the hydrogen confined in compartment 202 mixes with the surrounding helium, the present embodiment would still provide a hydrogen-containing lifting gas which does not suffer from the flammability concerns previously associated with conventional hydrogen lifting gases.

With reference still to FIG. 2, in one embodiment of the present invention compartment 202 is a rigid compartment. In other embodiments of the present invention, compartment 202 is a non-rigid compartment capable of expanding and/or contracting based upon the pressure and/or amount of hydrogen contained therein. Furthermore, in various embodiments of the present invention, compartment 202 is fillable with the desired amount of hydrogen without requiring substantial compression of the hydrogen. In one such embodiment compartment 202 may be evacuated prior to introduction of hydrogen and/or compartment 202 easily expands to mitigate significant compression of the introduced hydrogen. By eliminating the need to significantly compress the hydrogen, embodiments of the present invention advantageously enable compartment 202 to be filled rapidly and without the generation of heat caused by the compression of the hydrogen. This or the embodiment described in FIG. 1 will permit much more rapid refueling of the LTA craft than a conventional LTA whose hydrogen fuel is stored as compressed gas or liquid.

Still referring to FIG. 2, LTA craft 200 further includes a hydrogen supply line 208 coupled to supply line 104. In so doing, embodiments of the present invention fluidically couple hydrogen fuel cell 106, compartment 202 and volume of hydrogen 204 disposed within compartment 202. As a result, various embodiments of FIG. 2 supply hydrogen fuel cell 106 with, in some instances, substantially pure hydrogen. The generation of electricity and use and/or storage of the generated electricity can occur as described above in conjunction with the embodiments of FIG. 1. It should be noted that in various embodiments, supply line 104 and hydrogen supply line 208 are much more robust than, for example, envelope 102 thereby further mitigating the potential damage to supply line 104 or hydrogen supply line 208 and any potential leakage of hydrogen from supply line 104 or hydrogen supply line 208.

Figure 3:
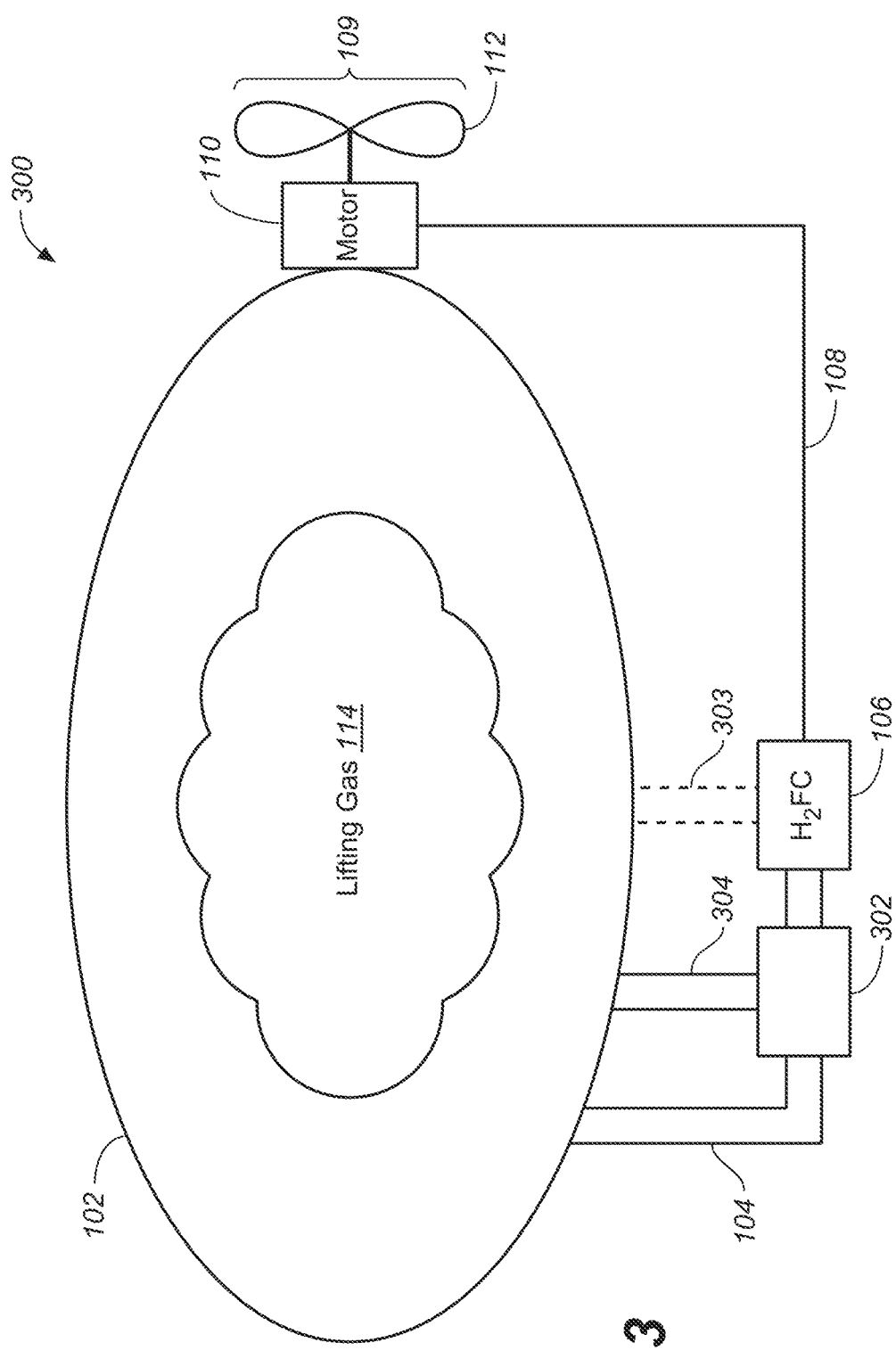
FIG. 3 is a schematic diagram of another embodiment of the present invention in which a lighter-than-air (LTA) craft includes a component for altering the concentration of hydrogen in the helium and hydrogen mixture comprising a lifting gas, in accordance with embodiments of the present invention.

With reference next to FIG. 3, another embodiment of the present invention is shown in which an LTA craft 300 includes a component 302 (coupled with supply line 104) for altering the concentration of hydrogen in the helium and hydrogen mixture comprising lifting gas 114. Moreover, in the present embodiment, component 302 alters the concentration of hydrogen prior to utilization of lifting gas 114 by hydrogen fuel cell 106. In various embodiments of the present invention, the hydrogen and helium comprising lifting gas 114 are at least partially separated from each other by component 302. Hence, component 302 effectively alters the concentration of hydrogen prior to utilization of lifting gas 114 by hydrogen fuel cell 106. In some embodiments, component 302 increases the ratio of hydrogen to helium in the mixture prior to utilization by hydrogen fuel cell 106. It should be noted that embodiments of the present invention are well suited to operation without component 302 since fuel cell 106 may operate on hydrogen mixed with other gases such as helium, outputting a mixture with less hydrogen. The other gasses, depleted of hydrogen, may be returned to the chamber 114, for example by a return line 303 which fluidically couples fuel cell 106 and envelope 102. As stated above, it should be noted that in various embodiments, supply line 104 and/or return line 303 are much more robust than, for example, envelope 102 thereby further mitigating the potential damage to supply line 104 and/or return line 303 and any potential leakage of hydrogen from supply line 104 and/or return line 303.

With reference again to FIG. 3, in one embodiment, component 302 is comprised, for example, of a palladium-based alloy. Such palladium-based alloys include, but are not limited to palladium alloyed with refractory metals such as, for example, niobium, molybdenum, ruthenium, tantalum, tungsten, rhenium, vanadium and the like. Further, in various embodiments of the present invention, component 302 may include, in addition to or in lieu of the above-described materials, low-melting metals such as, but not limited to, lithium, magnesium, indium, lead, tin, bismuth and the like. Additionally, in various embodiments of the present invention, such palladium alloys comprising component 302 are formed into high plasticity, micron-sized palladium-alloy foils and tubes. It should be noted that embodiments of the present invention are well suited to having component 302 be comprised of various other materials and/or structures capable of altering the concentration of hydrogen prior to utilization of lifting gas 114 by hydrogen fuel cell 106.

Referring still to FIG. 3, in various embodiments of the present invention, a return line 304 fluidically couples component 302 and envelope 102. In various embodiments, return line 304 is used to return, for example, helium separated from lifting gas 114 by component 302 to within envelope 102. It should be noted that in various embodiments return line 304 is used to return, for example, a mixture of helium and hydrogen, after interaction with component 302, to within envelope 102.

Figure 4:
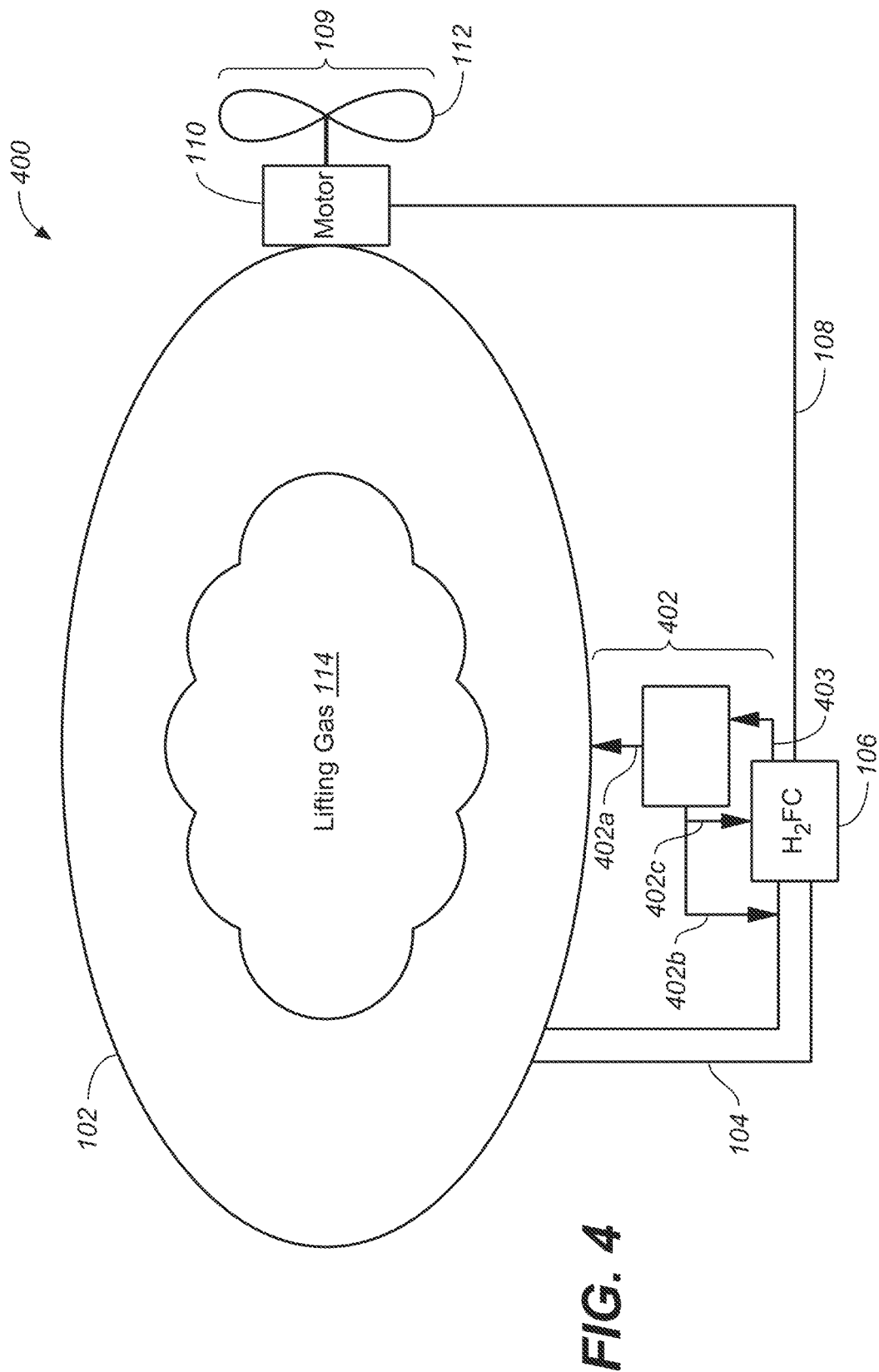
FIG. 4 is a schematic diagram of another embodiment of the present invention in which a lighter-than-air (LTA) craft includes a heat exchange component, in accordance with embodiments of the present invention.

With reference next to FIG. 4, another embodiment of the present invention is shown in which an LTA craft 400 includes a heat exchange component 402 fluidically coupling hydrogen fuel cell 106, envelope 102, and lifting gas 114 disposed within envelope 102. As stated above, a hydrogen fuel cell, such as hydrogen fuel cell 106, typically also produces heat and water during the exothermic process of generating electricity. In the present embodiment, said heat exchange component provides a flow path for heat, generated by hydrogen fuel cell 106, to be provided to, and/or directly inside of, envelope 102 to adjust the temperature of lifting gas 114. In the embodiment of FIG. 4, heat generated by hydrogen fuel cell 106 travels along path 403 of heat exchange component 402 and along path 402a of heat exchange component 402 to, and/or through, envelope 102 to alter the temperature of lifting gas 114. It will be understood that altering the temperature of lifting gas 114 can be advantageously used to, in turn, alter the buoyancy provided by lifting gas 114, which may be used to compensate for the loss of lifting force from the hydrogen consumed by fuel cell 106. In various other embodiments, heat generated by hydrogen fuel cell 106 travels along one or more of paths 402b and 402c (in addition to, or in lieu of travelling along path 402a) of heat exchange component 402 to alter the temperature of hydrogen fuel cell 106 and/or lifting gas 114 prior to utilization by hydrogen fuel cell 106. It will be understood that altering the temperature of hydrogen fuel cell 106 and/or lifting gas 114 prior to utilization by hydrogen fuel cell 106 can be advantageously used to, in turn, affect the operation/efficiency of hydrogen fuel cell 106.

Referring still to FIG. 4, in various embodiments of the present invention, paths 403, 402a, 402b and 402c are comprised of any suitable conduit for transferring heat including, but not limited to, pipes, heat-conductive solid structures, and the like. Additionally, in various embodiments of the present invention, LTA craft 400 will include both heat exchange component 402 and component 302 described above in conjunction with FIG. 3.

Figure 5:
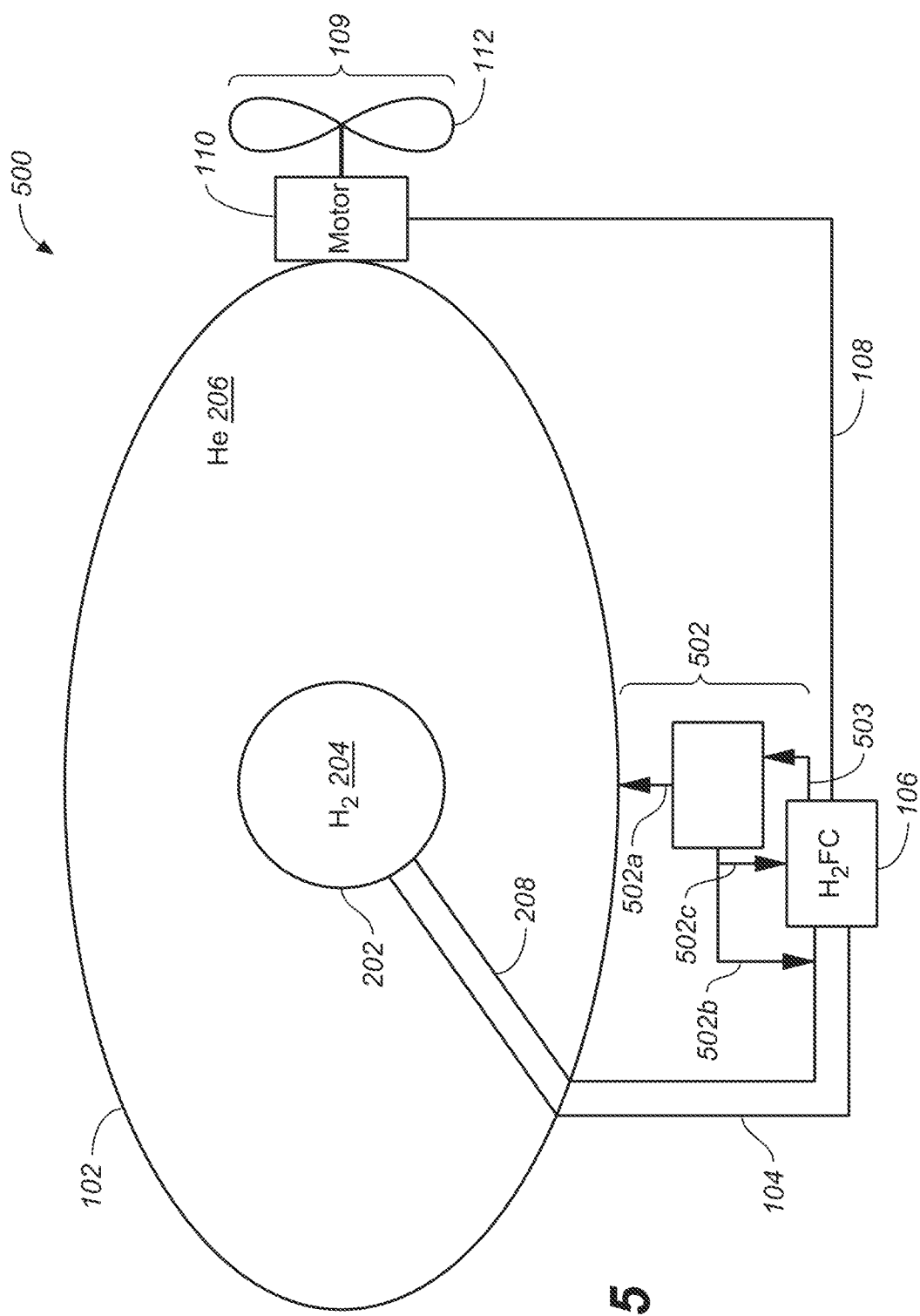
FIG. 5 is a schematic diagram of another embodiment of the present invention in which a lighter-than-air (LTA) craft includes a heat exchange component, in accordance with embodiments of the present invention.

With reference next to FIG. 5, another embodiment of the present invention is shown in which an LTA craft 500 includes a heat exchange component 502 fluidically coupling hydrogen fuel cell 106, envelope 102, and one or both of volume of helium 206 and volume of hydrogen 204 disposed within envelope 102. As stated above, a hydrogen fuel cell, such as hydrogen fuel cell 106, typically also produces heat and water during the exothermic process of generating electricity. In the present embodiment, said heat exchange component provides a flow path for heat, generated by hydrogen fuel cell 106, to be provided to, and/or directly inside of, envelope 102 to adjust the temperature of one or both of volume of helium 206 and volume of hydrogen 204. In the embodiment of FIG. 5, heat generated by hydrogen fuel cell 106 travels along path 503 of heat exchange component 502 and along path 502a of heat exchange component 502 to, and/or through, envelope 102 to alter the temperature of one or both of volume of helium 206 and volume of hydrogen 204. It will be understood that altering the temperature of one or both of volume of helium 206 and volume of hydrogen 204 can be advantageously used to, in turn, alter the buoyancy provided by one or both of volume of helium 206 and volume of hydrogen 204, which may be used to compensate for the loss of lifting force from the hydrogen consumed by fuel cell 106. In various other embodiments, heat generated by hydrogen fuel cell 106 travels along one or more of paths 502b and 502c (in addition to, or in lieu of travelling along path 502a) of heat exchange component 502 to alter the temperature of hydrogen fuel cell 106 and/or hydrogen prior to utilization by hydrogen fuel cell 106. It will be understood that altering the temperature of hydrogen fuel cell 106 and/or hydrogen prior to utilization by hydrogen fuel cell 106 can be advantageously used to, in turn, affect the operation/efficiency of hydrogen fuel cell 106.

Referring still to FIG. 5, in various embodiments of the present invention, paths 503, 502a, 502b and 502c are comprised of any suitable conduit for transferring heat including, but not limited to, pipes, heat-conductive solid structures, and the like.

Figure 6:
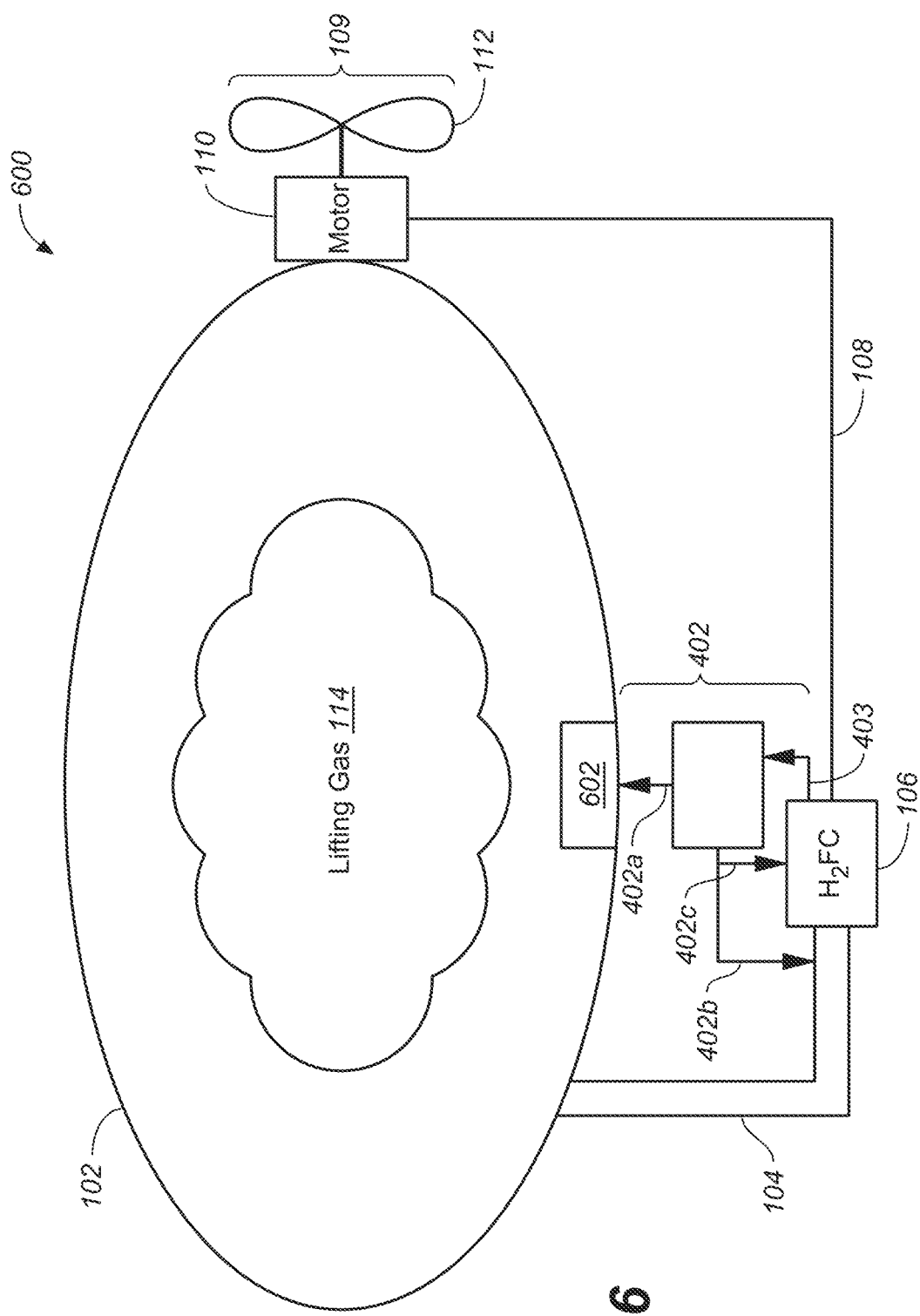
FIG. 6 is a schematic diagram of another embodiment of the present invention in which a lighter-than-air (LTA) craft includes a heat exchange component coupled with a buoyancy adjustment feature, in accordance with embodiments of the present invention.

With reference next to FIG. 6, another embodiment of the present invention is shown in which an LTA craft 600 includes a buoyancy adjustment feature 602 coupled with heat exchange component 402. In the embodiment of FIG. 6, buoyancy adjustment feature selectively directs heat to one or more regions within envelope 102 to control buoyancy characteristics of LTA craft 600. In various embodiments of the present invention, buoyancy adjustment feature is comprised of any suitable conduit for directing heat to one or more desired regions within envelope 102. It will be understood that altering the temperature of one or regions within envelope 102 can be advantageously used to, in turn, alter the buoyancy of the one or more regions within envelope 102. This may be used to compensate for the loss of lifting force from the hydrogen consumed by fuel cell 106 and/or control buoyancy locally. As an example, altering the temperature at the front or rear of LTA craft 600 can be used to adjust the pitch of LTA craft 600. Likewise, altering the temperature at the left/port or right/starboard regions of LTA craft 600 can be used to adjust the roll of LTA craft 600.

Figure 7:
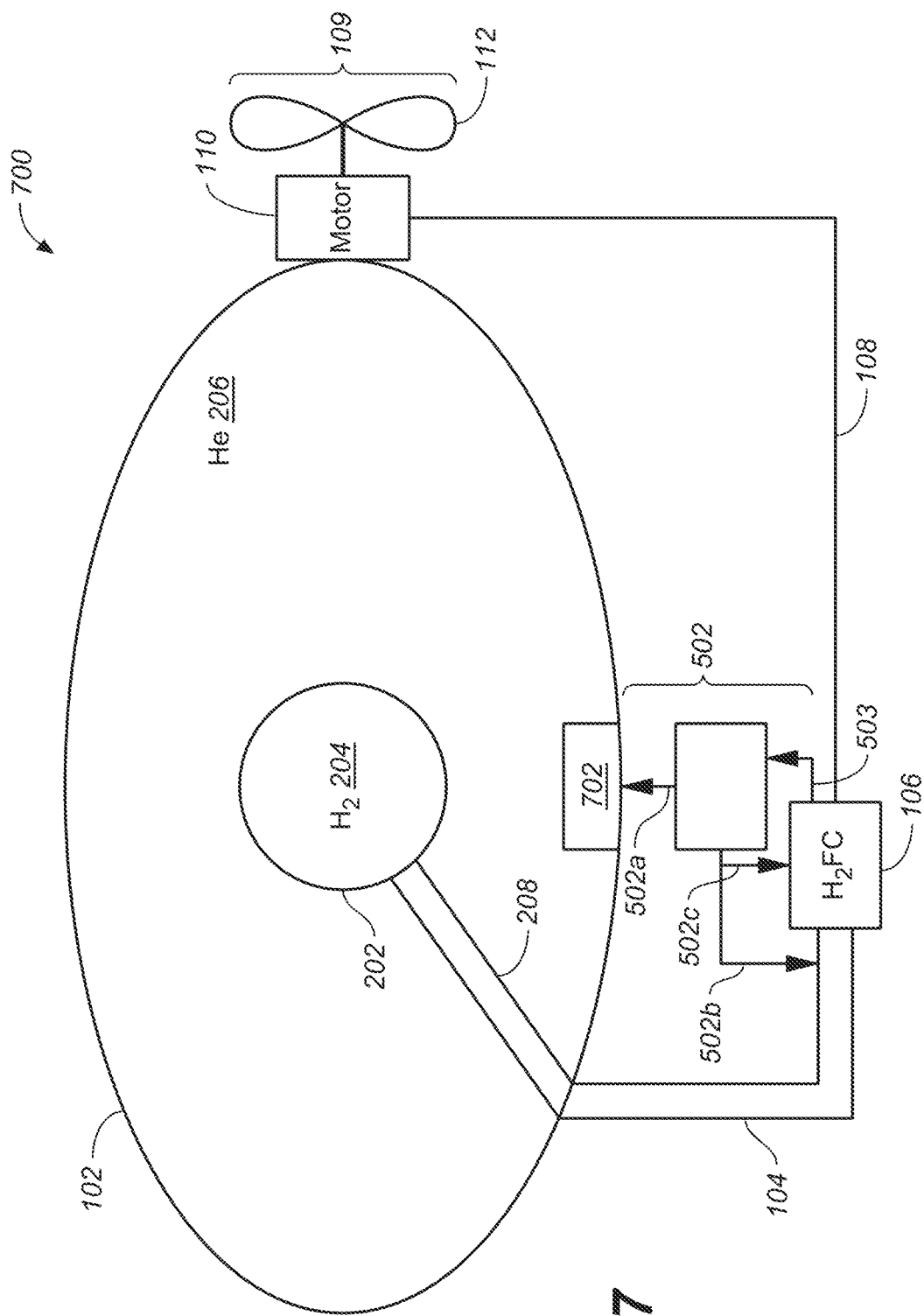
FIG. 7 is a schematic diagram of another embodiment of the present invention in which a lighter-than-air (LTA) craft includes a heat exchange component coupled with a buoyancy adjustment feature, in accordance with embodiments of the present invention.

With reference next to FIG. 7, another embodiment of the present invention is shown in which an LTA craft 700 includes a buoyancy adjustment feature 702 coupled with heat exchange component 502. In the embodiment of FIG. 7, buoyancy adjustment feature selectively directs heat to one or more regions within envelope 102 to control buoyancy characteristics of LTA craft 700. In various embodiments of the present invention, buoyancy adjustment feature is comprised of any suitable conduit for directing heat to one or more desired regions within envelope 102. It will be understood that altering the temperature of one or regions within envelope 102 can be advantageously used to, in turn, alter the buoyancy of the one or more regions within envelope 102. As an example, altering the temperature (of compartments) at the front or rear of LTA craft 700 can be used to adjust the pitch of LTA craft 700. Likewise, altering the temperature at the left or right regions of LTA craft 700 can be used to adjust the roll of LTA craft 700.

Figure 8:
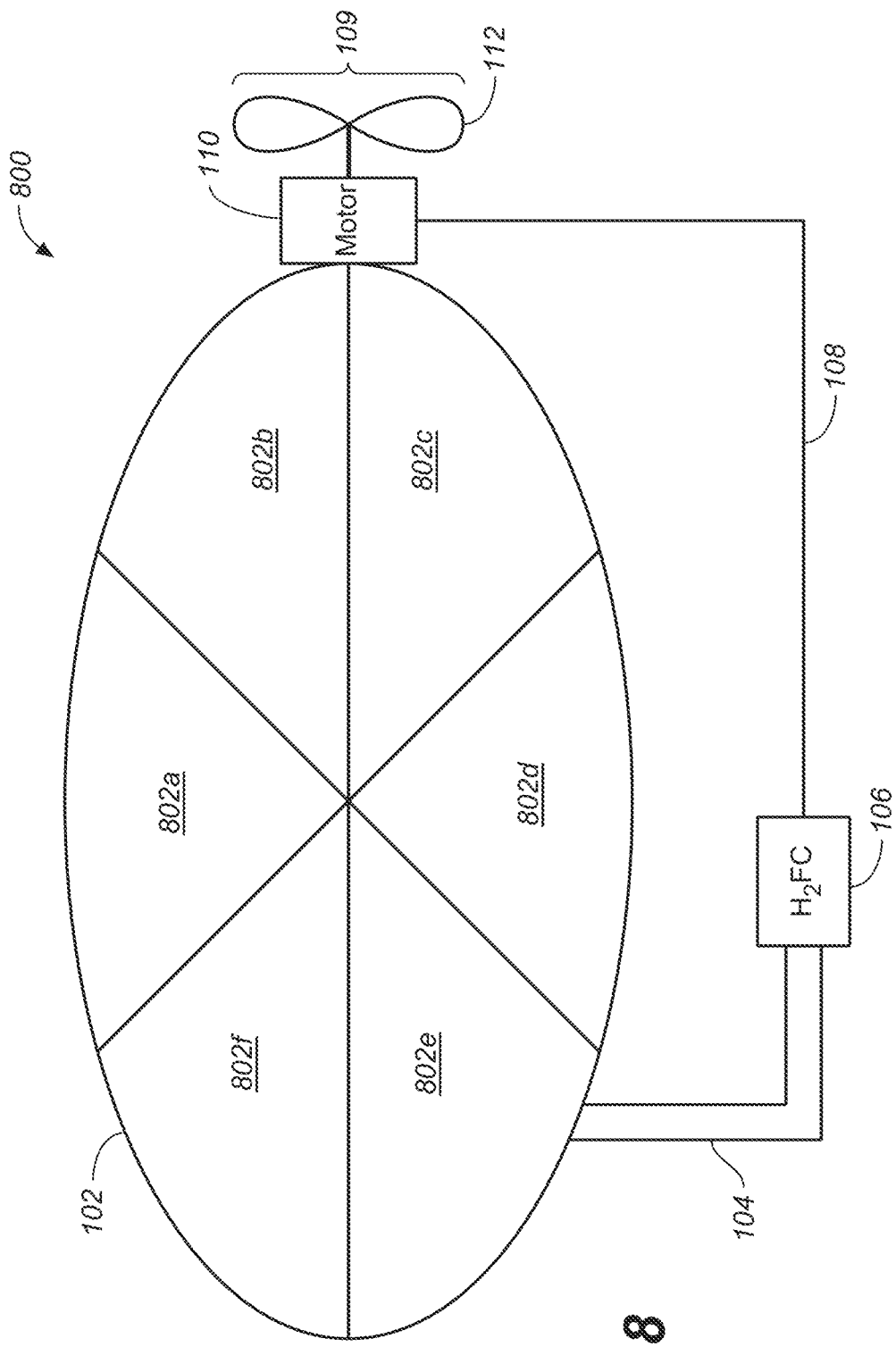
FIG. 8 is a schematic diagram of another embodiment of the present invention in which a lighter-than-air (LTA) craft includes a plurality of regions disposed within its enclosure, in accordance with embodiments of the present invention.

With reference next to FIG. 8, another embodiment of the present invention is shown in which an LTA craft 800 includes a plurality of regions 802a-802f disposed within enclosure 102. In one such embodiment, plurality of regions 802a-802f are at least partially fluidically isolated from at least one other region. Such an embodiment mitigates potential complete, and/or catastrophic, leakage of lifting gas from enclosure 102, enables improved buoyancy control, and provides for precise adjustments to pitch, yaw and roll of LTA craft 800. Furthermore, embodiments of the present invention enable features such as heat exchange component 402 and/or 502 of FIGS. 4 and 5, respectively, and buoyancy control feature 602 and/or 702, of FIGS. 6 and 7, respectively, to selectively alter the temperature of lifting gases in specific regions within enclosure 102.

Figure 9:
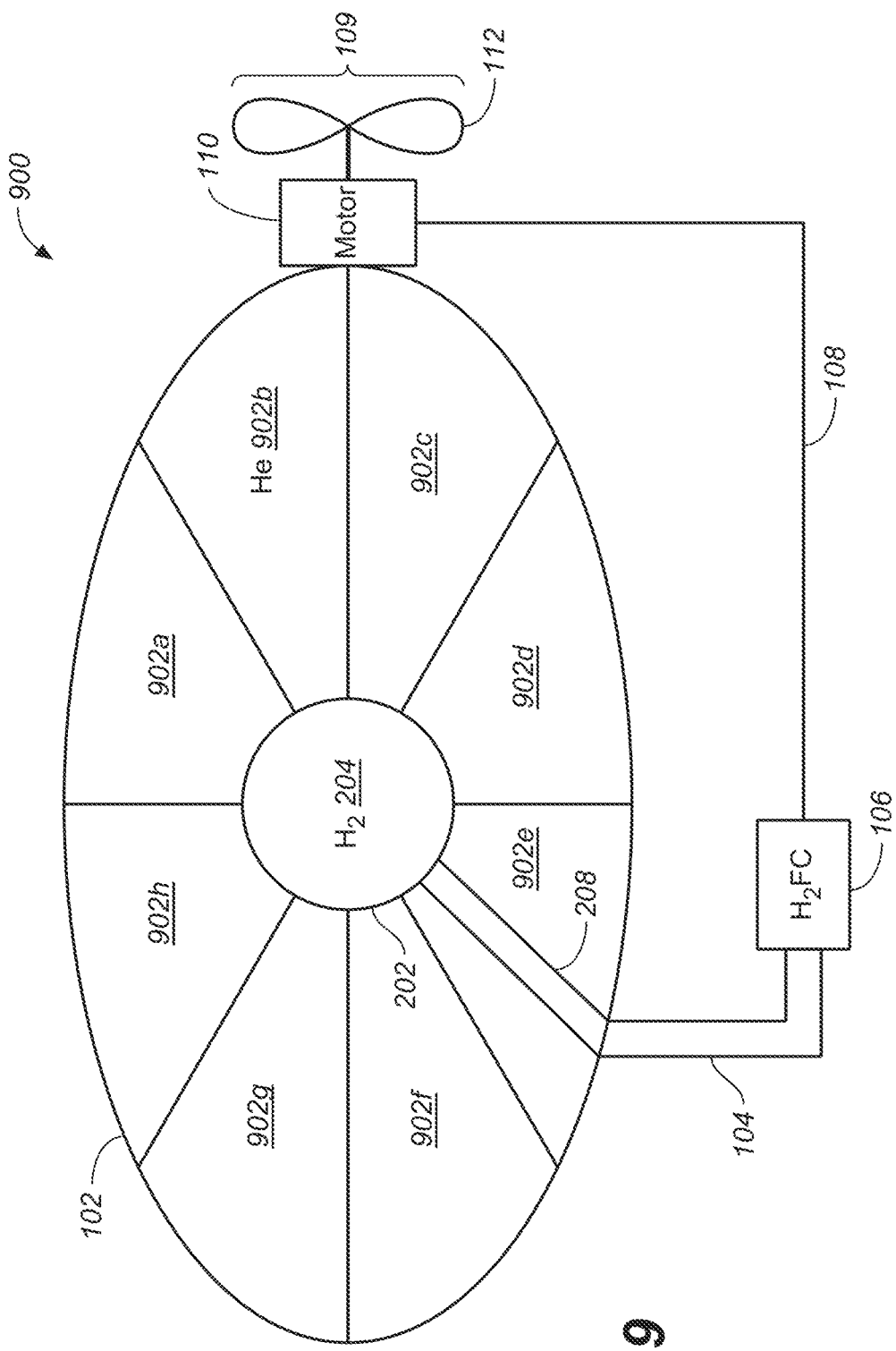
FIG. 9 is a schematic diagram of another embodiment of the present invention in which a lighter-than-air (LTA) craft includes a plurality of regions disposed within its enclosure, in accordance with embodiments of the present invention.

With reference next to FIG. 9, an embodiment of the present invention is shown in which an LTA craft 900 includes a plurality of regions 902a-902h disposed within enclosure 102. In one such embodiment, plurality of regions 902a-902h are at least partially fluidically isolated from at least one other region. Such an embodiment mitigates potential complete, and/or catastrophic, leakage of lifting gas from enclosure 102, enables improved buoyancy control, and provides for precise adjustments to pitch, yaw and roll of LTA craft 900. Furthermore, embodiments of the present invention enable features such as heat exchange component 402 and/or 502 of FIGS. 4 and 5, respectively, and buoyancy control feature 602 and/or 702, of FIGS. 6 and 7, respectively, to selectively alter the temperature of, for example, helium in specific regions within enclosure 102.

Figure 10:
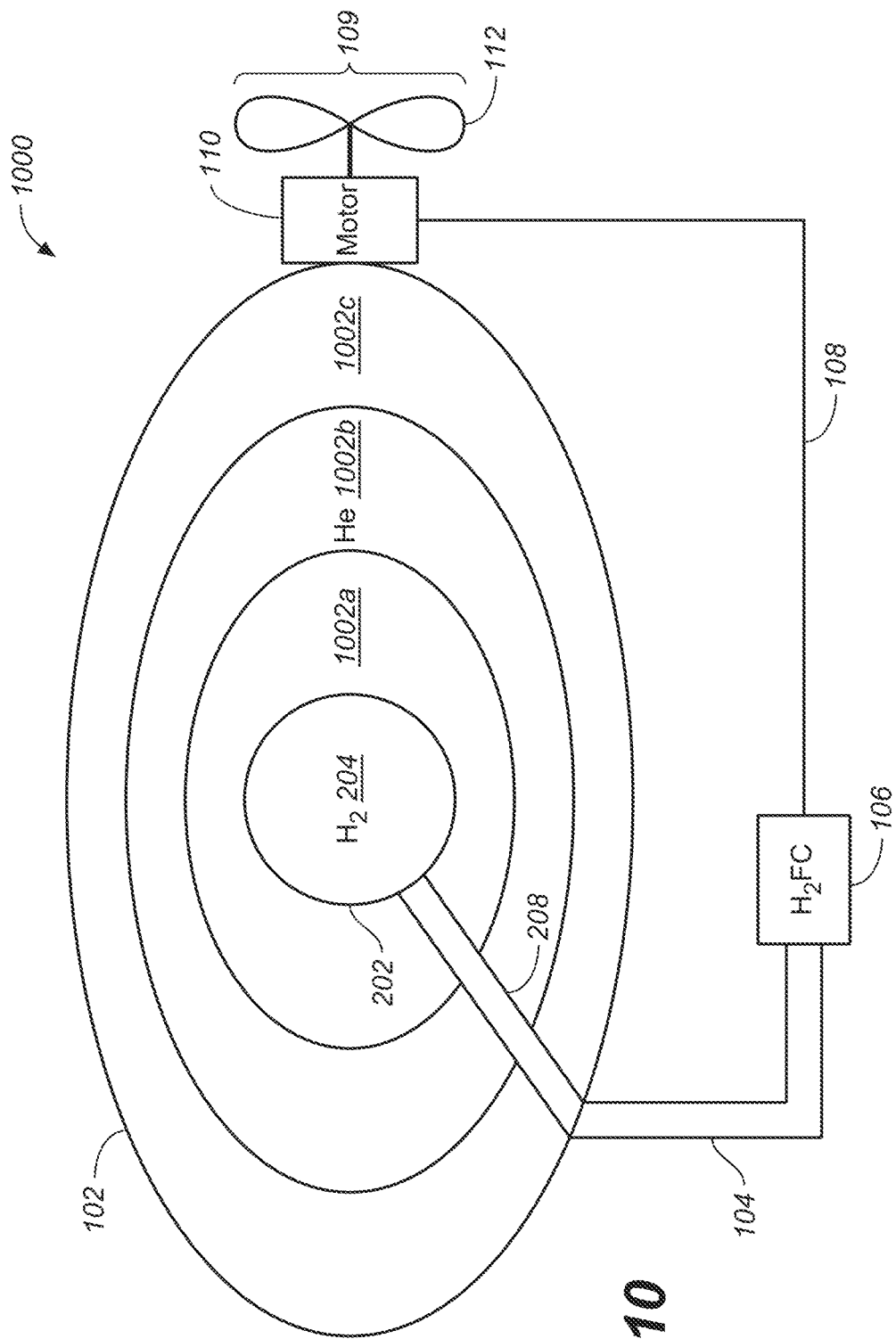
FIG. 10 is a schematic diagram of another embodiment of the present invention in which a lighter-than-air (LTA) craft includes a plurality of regions disposed within its enclosure, in accordance with embodiments of the present invention.

With reference next to FIG. 10, an embodiment of the present invention is shown in which an LTA craft 1000 includes a plurality of regions 1002a-1002c disposed within enclosure 102. In one such embodiment, plurality of regions 1002a-1002c are at least partially fluidically isolated from at least one other region. Such an embodiment mitigates potential complete, and/or catastrophic, leakage of lifting gas from enclosure 202, enables improved buoyancy control, and provides for precise adjustments to pitch, yaw and roll of LTA craft 1000. Further, as with the various embodiments described above, in the embodiment of FIG. 10, the ratio of volume of hydrogen (in various compartments) with respect to the surrounding volume of helium (in various compartments) is defined such that if the entirety of the volume of hydrogen and the volume of helium are combined to form a mixture, the mixture is nonflammable during operating conditions for LTA craft 1000. Furthermore, embodiments of the present invention enable features such as heat exchange component 402 and/or 502 of FIGS. 4 and 5, respectively, and buoyancy control feature 602 and/or 702, of FIGS. 6 and 7, respectively, to selectively alter the temperature of, for example, helium in specific regions within enclosure 102. It should be noted that although several examples of shapes, orientations and quantities of a plurality of regions are provided in FIGS. 8, 9 and 10, embodiments of the present invention are well suited to use with various other shapes, orientations and quantities for the plurality of regions.

Figure 11:
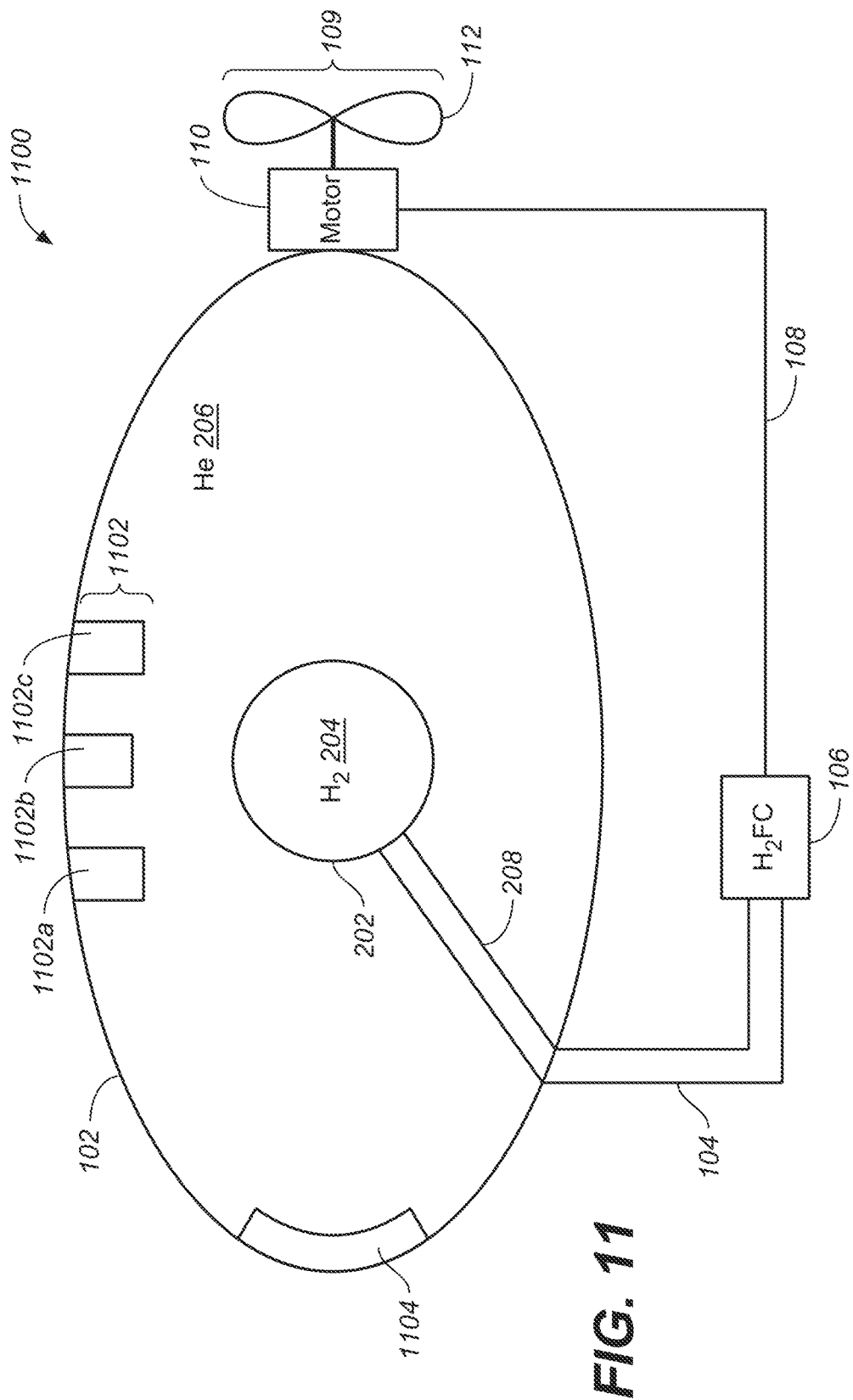
FIG. 11 is a schematic diagram of another embodiment of the present invention in which a lighter-than-air (LTA) craft includes one or more sensors and/or a hydrogen scavenging component, in accordance with embodiments of the present invention.
Figure 1A:
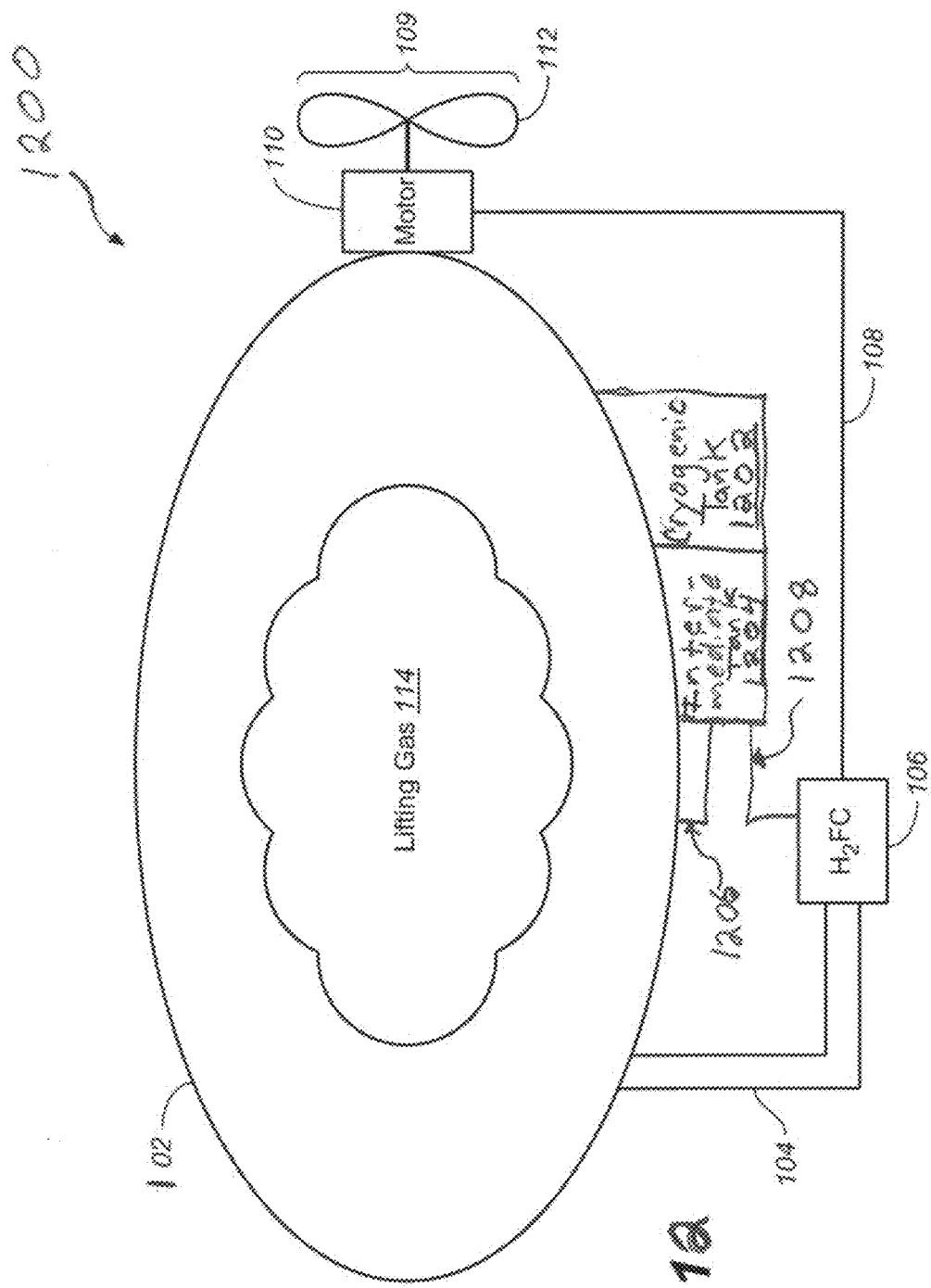

With reference now to FIG. 11, an embodiment of the present invention is shown in which an LTA craft 1100 includes one or more sensors shown as 1102. In the embodiment of FIG. 11, three sensors are schematically depicted as 1102a, 1102b and 1102c. In various embodiments of the present invention, one or more sensors 1102 are comprised of any of various sensor types including, but not limited to, an oxygen sensor, an air sensor, a hydrogen sensor, a helium sensor, and the like. In various embodiments of the present invention, one or more sensors 1102 are used, for example, to detect a leak (into or out of) enclosure 102, detect the presence (or monitor the concentration level) of gases such as, for example, hydrogen and/or helium within enclosure 102. It should be noted that one or more sensors 1102 are also well suited for use in an embodiment as shown in any of FIGS. 1-10.

With reference still to FIG. 11, in one embodiment of the present invention LTA craft 1100 includes one or more hydrogen scavenging component 1104 coupled to envelope 102. In the present embodiment, hydrogen scavenging component 1104 is configured to scavenge hydrogen present within enclosure 102 but which is outside of compartment 202. In one embodiment, hydrogen scavenging component 1104 is comprised of a palladium-based getter element. It should be noted that embodiments of the present invention are well suited to use with any of various of types of hydrogen scavenging components. It should further be noted that hydrogen scavenging component 1104 can be used with or without one or more sensors 1102, and that hydrogen scavenging component 1104 is also well suited for use in an embodiment as shown in any of FIGS. 1-10.

As mentioned above, conventional cryogenic storage mechanisms for liquid hydrogen are not well suited for use in LTA craft and other aircraft. This is due, in part, to the additional weight associated with conventional cryogenic storage mechanisms for liquid hydrogen. It should also be noted that the boiling point of hydrogen, at one atmosphere of pressure, is approximately −252.8 degrees Celsius. As a result of the difficulty of constantly keeping the liquid hydrogen sufficiently cooled below its boiling point, it is very likely that at least some portion of stored liquid hydrogen will transition to a gaseous state. This transition from a liquid state to gaseous state is commonly referred to as "boiloff". In certain applications the liquid hydrogen is temporarily stored without active cooling and/or without substantial additional insulation. In such applications, the amount of boiloff, or the rate at which boiloff occurs, will likely exceed the rate of boiloff found in more heavily insulated and/or actively cooled cryogenic storage mechanisms for liquid hydrogen. In most scenarios, for example in rockets using liquid hydrogen, the boiloff is simply vented or expelled to the atmosphere and lost.

With reference now to FIG. 12, an embodiment of the present invention is shown in which boiloff from cryogenically stored liquid hydrogen is advantageously captured and utilized rather than being expelled and lost as is conventionally done. With reference still to FIG. 12, a cryogenic tank 1202 is shown coupled to an intermediate tank 1204. In embodiments of the present invention, boiloff of gaseous hydrogen from cryogenic tank 1202 can be received by intermediate tank 1204. It should be noted that embodiments of the present invention are well suited to having intermediate tank 1204 receive all of the boiloff from cryogenic tank 1202. In other embodiments of the present invention, intermediate tank 1204 receives some portion of the total amount of the boiloff from cryogenic tank 1202.

Referring now to lifting gas 114 of FIG. 12, in one embodiment of the present invention, lifting gas 114 is comprised of helium and hydrogen gas. As stated previously, hydrogen has long been deemed unsuitable for use as a lifting gas in LTA craft due to the flammability of hydrogen. In the present embodiment, lifting gas 114 is comprised of a mixture wherein the percent by volume of hydrogen does not exceed approximately 4 percent. As hydrogen has a lower explosive limit (LEL) of approximately 4 percent by volume in air, embodiments of the present invention advantageously provide a hydrogen-containing lifting gas which does not suffer from the flammability concerns previously associated with conventional hydrogen lifting gases. In another embodiment, lifting gas 114 is comprised of a mixture wherein the percent by volume of hydrogen does not exceed a percentage such that when lifting gas 114 escapes to an environment where sufficient oxygen for combustion is present and mixes to form a local mixture, the percent by volume of hydrogen in the local mixture does not exceed the LEL at any point. As a result, in various embodiments of the present invention, lifting gas 114 is nonflammable during operating conditions for LTA craft 1200.

As stated above, in embodiments of the present invention, LTA craft 1200 comprises and optional supply line 104 which fluidically couples hydrogen fuel cell 106 and lifting gas 114. As a result, in some embodiments of the present invention, not only does lifting gas 114 provide buoyancy for LTA craft 1200, lifting gas 114 also provides a suitable hydrogen source for hydrogen fuel cell 106. In various other embodiments of the present invention, hydrogen fuel cell 106 receives hydrogen gas only from intermediate tank 1204 via line 1208. In various embodiments of the present invention, the pressure within intermediate tank 1204 is controlled to meet various performance and operation characteristics. In one such embodiment, intermediate tank 1204 is maintained at a pressure which enables efficient transfer of hydrogen gas from intermediate tank 1204 to hydrogen fuel cell 106 via line 1208. In other embodiments, intermediate tank 1204 comprises a variable volume container, e.g., a balloon, that maintains hydrogen at atmospheric pressure which may then be transferred to hydrogen fuel cell 106 via a pump fluidically coupled in line 1208 and/or transferred to envelope 102 via a pump fluidically coupled in line 1206. Thus, unlike many conventional systems, embodiments of the present invention reduce or entirely eliminate the expelling and corresponding wasting of hydrogen boiloff. That is, embodiments of the present invention advantageously capture and utilize hydrogen boiloff.

Additionally, in various embodiments of the present invention, intermediate tank 1204 is fluidically coupled, via line 1206, with the interior of LTA craft 1200. In such an embodiment, intermediate tank 1204 is able to provide hydrogen gas boiloff, received from cryogenic tank 1202, to the interior of LTA craft 1200. Thus, in such embodiments, boiloff from cryogenic tank 1202 is ultimately used to enhance, alter, or otherwise regulate the amount lifting gas within LTA craft 1200. In one such embodiment, intermediate tank 1204 is maintained at a pressure which enables efficient transfer of hydrogen gas from intermediate tank 1204 to the interior of LTA craft 1200 via line 1208. In various other embodiments, the hydrogen gas boiloff from intermediate tank 1204, as received from cryogenic tank 1202, is used to provide hydrogen gas to hydrogen fuel cell 106 via line 1208 and to provide hydrogen gas to the interior of LTA craft 1200 via line 1206. In other embodiments, one or more first intermediate tanks may provide hydrogen gas to hydrogen fuel cell 106 via line 1208 and one or more second intermediate tanks may provide hydrogen gas to the interior of LTA craft 1200 via line 1206.

Several other advantages are realized by the various embodiments of the present invention. As one example, embodiments of the present invention enable a reduced need for minimizing hydrogen boiloff (as the hydrogen boiloff is used and not wasted) resulting in less dependence upon a complex and heavy cryogenic mechanism for the liquid hydrogen. By reducing the need for such complex and heavy cryogenic mechanisms, embodiments of the present invention enable a lighter overall aircraft. More specifically, by capturing the hydrogen boiloff rather than conventionally wasting or expelling hydrogen boiloff, embodiments of the present invention can use less insulation and/or smaller/lighter active cooling systems.

Furthermore, it should be noted that the embodiment depicted in FIG. 12 can also be utilized in combination with any of the various embodiments described above in conjunction with FIGS. 1-11. For example, the hydrogen gas boiloff from intermediate tank 1204, as received from cryogenic tank 1202, can be used to provide hydrogen gas to the interior of an LTA craft via line 1206 to, for example, the plurality of regions 802a-802f of the embodiment of FIG. 8, the plurality of regions 902a-902h of the embodiment of FIG. 9, and/or the plurality of regions 1002a-1002c of the embodiment of FIG. 10.

Referring still to FIG. 12, and as was discussed in detail above, it should be noted that hydrogen fuel cell 106 is comprised of any type of hydrogen fuel cell which utilizes hydrogen and oxygen (the oxygen obtained, for example, from the surrounding air) to generate electricity. It should further be noted, as was discussed in detail above, that a hydrogen fuel cell, such as hydrogen fuel cell 106, typically also produces heat and water during the exothermic process of generating electricity.

Referring still to LTA craft 1200 of FIG. 12, in embodiments of the present invention electrical supply line 108 electrically couples hydrogen fuel cell 106 with propulsion system 109. As stated above, although propulsion system 109 of LTA craft 100 is comprised of motor 110 and propeller 112, embodiments of the present invention are well suited to use with a propulsion system comprised of components other than motor 110 and propeller 112, for example many variants of electric propulsion including one or more of a ducted fan, ion drive, directed thrust, tilted lift system, and propeller. In various embodiments of the present invention, propulsion system 109 will further comprise a battery or other electricity storage device, not shown, for storing electricity generated by hydrogen fuel cell 106. Hence, in some embodiments of the present invention, electricity generated by hydrogen fuel cell 106 is provided to propulsion system 109 using electrical supply line 108, and the generated electricity is used to directly power, for example, motor 110 to drive propeller 112. In other embodiments, electricity generated by hydrogen fuel cell 106 and/or stored in an electricity storage device is provided to electrical components of LTA craft including, for example, air conditioning, avionics, control systems, and lighting. In some embodiments, at the desired point in cruise the LTA craft could consume its own lifting gas 114 for the hydrogen fuel cell 106 and, in removing hydrogen from envelope 102, become heavier than air, gliding down, and using the excess H2 for additional forward thrust as described above.

Referring again to FIG. 12, in various other embodiments of the present invention, electricity generated by hydrogen fuel cell 106 is provided to propulsion system 109, using electrical supply line 108, and the generated electricity is stored, for example in a battery, for subsequent and/or simultaneous use by propulsion system 109. Such simultaneous use may occur, for example, during periods of greater power demand or need from propulsion system 109. Further, embodiments of the present invention are well suited to use with various combinations of direct/immediate use of electricity generated by hydrogen fuel cell 106 and storage/deferred use of electricity generated by hydrogen fuel cell 106.

Figure 13:
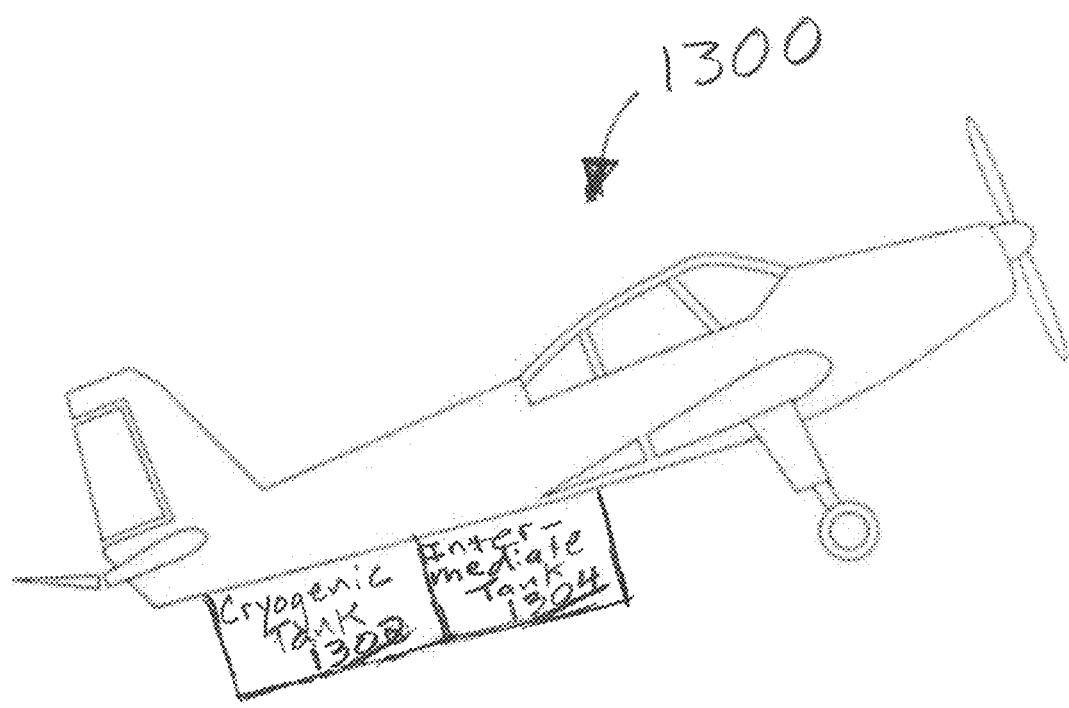
FIG. 13 is a schematic diagram of a heavier-than-air craft having a cryogenic tank and an intermediate tank which are coupled to a hydrogen fuel cell and a propulsion system, in accordance with embodiments of the present invention.

With reference now to FIG. 13, embodiments of the present invention are also well suited to use with conventional or "heavier-than-air" craft 1300. In FIG. 13, a cryogenic tank 1302 is shown coupled to an intermediate tank 1304. In embodiments of the present invention, boiloff of gaseous hydrogen from cryogenic tank 1302 can be received by intermediate tank 1304. It should be noted that embodiments of the present invention are well suited to having intermediate tank 1304 receive all of the boiloff from cryogenic tank 1302. In other embodiments of the present invention, intermediate tank 1304 receives some portion of the total amount of the boiloff from cryogenic tank 1302.

Referring still to FIG. 13, as was described in detail above in conjunction with the embodiments of FIG. 12, in one embodiment, a hydrogen fuel cell, not shown, receives hydrogen gas from intermediate tank 1304 via a supply line, not shown. Many of the various configurations and embodiments described above in conjunction with FIG. 12 are similarly applicable to heavier-than-air craft 1300 of FIG. 13 and are not repeated here for purposes of brevity and clarity. However, it should be noted that the embodiments of FIG. 13, unlike many conventional systems, reduce or entirely eliminate the expelling and corresponding wasting of hydrogen boiloff. That is, embodiments of the present invention, as depicted in FIG. 13, advantageously capture and utilize hydrogen boiloff.

Referring again to FIG. 13, in one embodiment, heavier-than-air craft 1300 will consume the captured hydrogen gas boiloff and use the captured hydrogen gas boiloff (and a hydrogen fuel cell) to provide power to heavier-than-air craft 1300.

The foregoing Description of Embodiments is not intended to be exhaustive or to limit the embodiments to the precise form described. Instead, example embodiments in this Description of Embodiments are presented to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended Claims is not necessarily limited to the specific features or acts described above. Rather, the specific features and acts described above are disclosed by way of illustration and as example forms of implementing the Claims and their equivalents.

We claim:

1. A hydrogen boiloff capture system comprising:
    a cryogenic tank for storing liquid hydrogen; and
    an intermediate tank fluidically coupled with said cryogenic tank, said intermediate tank configured to receive hydrogen gas boiloff from said cryogenic tank without passing the hydrogen through a heater, said intermediate tank further configured to provide said hydrogen gas boiloff to a hydrogen fuel cell coupled to a heavier-than-air craft, and wherein said intermediate tank comprises a variable volume container.

2. The hydrogen boiloff capture system of claim 1, wherein said intermediate tank is configured to receive hydrogen gas boiloff directly from said cryogenic tank.

3. The hydrogen boiloff capture system of claim 1, wherein a pressure within said intermediate tank is controlled to meet a performance characteristic.

4. A heavier-than-air craft comprising:
    a cryogenic tank for storing liquid hydrogen;
    an intermediate tank fluidically coupled with said cryogenic tank, said intermediate tank configured to receive hydrogen gas boiloff from said cryogenic tank without passing the hydrogen through a heater, and wherein said intermediate tank comprises a variable volume container;
    a hydrogen fuel cell fluidically coupled with said intermediate tank, said intermediate tank further configured to provide said hydrogen gas boiloff to said hydrogen fuel cell, said hydrogen fuel cell configured to utilize said hydrogen gas boiloff to generate electricity; and
    a propulsion system coupled to said hydrogen fuel cell, said propulsion system configured to provide propulsion for said heavier-than-air craft, said propulsion system configured to receive said electricity generated by said hydrogen fuel cell, said propulsion system configured to utilize said electricity in providing said propulsion to said heavier-than-air craft.

5. The heavier-than-air craft of claim 4, wherein said intermediate tank is configured to receive hydrogen gas boiloff directly from said cryogenic tank.

6. The heavier-than-air craft of claim 4, wherein a pressure within said intermediate tank is controlled to meet a performance characteristic.

* * * * *